United States Patent Office 2,768,116
Patented Oct. 23, 1956

2,768,116

ENZYMATIC SYNTHESIS OF 4-O-β-D-GALACTO-PYRANOSYL - N - ACETYL - D - GLUCOSAMINE USING LIVING CELLS

Paul György, Villanova, and Friedrich Zilliken, Philadelphia, Pa., assignors to American Home Products Corporation, New York, N. Y., a corporation of Delaware No Drawing. Application June 3, 1955,
Serial No. 513,163

6 Claims. (Cl. 195—28)

This application is a continuation-in-part of our co-pending application Serial No. 397,469, filed December 10, 1953.

It has recently been discovered that a specific growth-promoting factor which is present in human (breast) milk is essential to promote the growth of a specific strain of the *Lactobacillus bifidus* microorganism, this specific strain being originally identified as No. 212A, then as *L. bifidus* var. Penn, and more recently as *Lactobacillus bifidus* var. *pennsylvanicus*. A strain of this microorganism is available from the American Type Culture Collection, where it is on deposit as No. 11,863. This microorganism has been known for some time to constitute an important part of the intestinal flora of a breast-fed infant.

The specific growth-promoting factor for *Lactobacillus bifidus*, and its importance in infant nutrition, can be best explained with reference to the growth and proliferation of the *Lactobacillus bifidus* microorganism in the intestinal tract of the young child, particularly in the intestinal tract of those infants who are fed exclusively with human or breast milk.

*Lactobacillus bifidus* constitutes the predominant microorganism of the flora present in the stools of breast-fed infants. As grown in colonies in the intestinal tract of infants nursed with human (breast) milk, the organism is gram-positive. Morphologically it comprises straight or curved rods which are non-motile and which do not form spores. One end of the rod may be bulbous or racket-shaped, and one or both ends may appear to be split longitudinally to give the effect of two short branches. Lateral branches of relatively short length may also be present. This appearance of the microorganism as it propagates has led to its characterization as "bifid."

The *L. bifidus* microorganism grows in cultures under anaerobic or microaerophilic conditions, which are herein defined as those in which the oxygen content is less than from 2 to 4%. It will continue to grow for an indefinite period in numerous subcultures provided the necessary microaerophilic conditions are strictly maintained.

By the third or fourth day after birth, the intestinal flora of the breast-fed infant is characterized by the presence of *Lactobacillus bifidus* as the predominating microorganism. In the stools of breast-fed infants practically the entire flora is made up of this organism.

The predominance of this microorganism in the intestinal tract and feces is characteristic only of those infants who are fed human (breast) milk. Infants who are fed with the milk of other animals, such as cows' milk, or with preperations in which cows' milk is an important constituent, do not shown predominance of *L. bifidus*, the microorganism content of their feces comprising a less uniform flora with an appreciable proportion of gram-negative rods and cocci.

The fact that a stable *L. bifidus* flora is characteristic only of the intestinal tract of breast-fed infants is now fully understood and appreciated by pediatricians and other specialists in the medical, biological and nutritional sciences. See, for example, the publications of Tissier; Comptes rendus soc. biol., 51, pages 943–945; and 60, pages 359–361; and Ann. inst. Pasteur, 19, pages 109–123; and 22, pages 189–207. See also the papers of Moro; Wien, klin. Wochschr.; 13, pages 114–115, and Jahrb. Kinderheilk, 61, pages 687–734; and 61, pages 870–899. That the original observations of Tissier concerning the predominance of *L. bifidus* in nursling's stools have been amply confirmed is pointed out in the more recent publication of Norris, Flanders, Tomarelli and György in the Journal of Bacteriology, 60, pages 681–696 (December 1950).

Medical authorities are now in general agreement that many of the advantages which a breast-fed infant seems to have, insofar as its nutrition and resistance to certain diseases are concerned, are attributable, at least in part, to the predominance in the intestines of *L. bifidus*. The predominance of this organism is now believed to be of physiological significance, and its growth may prevent intestinal disorders caused by other bacteria. Resistance to bacterial intestinal diseases, and even to parenteral disorders, such as respiratory infections, is typical of breast-fed infants, infants who are bottle-fed with the milk of cows and other animals being markedly more susceptible to such disorders. In this connection see the article of Robinson, Lancet, "Infant Morbidity and Mortality," vol. CCLX, page 788 (April 7, 1951).

In the infant colon in which a stable *L. bifidus* flora is lacking, it is now generally believed that the infant is more likely to suffer from disorders attributable to the growth of other bacteria, some of which are harmful to the infant, since competition for the available food supply in the infant intestinal tract where *L. bifidus* flourish reduces the possibility that other bacteria, particularly the harmful *B. coli*, may grow in considerable numbers or in extensive colonies. In any event, where the gram-positive bacillus *L. bifidus* is present in large numbers in the infant intestine, which occurs only when the infant is breast-fed, there is considerably less growth of other microorganisms, particularly the gram-negative *B. coli*, Clostridia, and air-borne microorganisms, such as the Sarcinae bacteria. While the reasons for the superior resistance to disease of breast-fed infants, as compared with infants who are fed on cows' milk, or on the usual infant formulas in which cows' milk is a principal constituent, are not fully understood, pediatricians are generally agreed, however, that in some measure at least the superior resistance is attributable to the growth of an extensive *L. bifidus* flora in the intestines of nurslings, this bacterium being absent in any appreciable numbers from the intestines of all infants except those who are nursed with human milk. Interest in the isolation and determination of the growth requirements of *L. bifidus* has therefore been stimulated by its apparently unique predominance in the intestinal tract of the breast-fed infant.

For some time research has been carried out in an effort to isolate and identify the active biological factor which is responsible for promoting the growth of some strains of the microorganism, *Lactobacillus bifidus*. In the copending patent application of György, Kuhn and Zilliken, Serial No. 283,006, filed April 18, 1952, the isolation and recovery of this growth-promoting factor from human milk is described and claimed.

By a process which involves defatting human milk, removing substantially all protein therefrom, removing inorganic and mineral substances then remaining in the human milk fraction, and finally by adsorbing the active growth-promoting factor or principle on a solid adsorbent and eluting it therefrom by means of suitable eluants, the new growth-promoting factor for *Lactobacillus bifidus* was recovered from breast milk.

As recovered in the form of a dry powder, and as described in said patent application, the new biologically-active material is identified as being non-protein in character. It is free from amino acids, peptides and proteins. It does not give a positive test with ninhydrin, but after acid hydrolysis the ninhydrin test becomes positive, due to the formation of d-glucosamine.

Chemically the new *Lactobacillus bifidus* growth-promoting factor is characterized as comprising substances of the group of N-glycosides containing N-acetyl-hexosamines in glycosidic linkage. Upon hydrolysis under acid conditions it is converted to hexosamines, as determined colorimetrically by the Morgan-Elson test.

The new growth-promoting factor contains the chemical elements hydrogen, nitrogen, carbon and oxygen, but it does not contain either sulfur or phosphorus. Its nitrogen content is relatively low, falling within the range 1.7% to 2.0%. It is adsorbed on adsorbent agents such as carbon, charcoal, cellulosic products such as filter paper, adsorbing resins, and cellulosic powders, being, however, most typically and most easily adsorbed on the carbonaceous adsorbents. It is extremely resistant to high temperatures, and will withstand temperatures well over 100° C., as, for example, when it is sterilized by heating under pressure in aqueous solutions at a temperature of 120° C. for 15 minutes or longer. The growth-promoting factor of human milk is present in a large proportion in a dialyzable form; (see the article by György in Pediatrics, vol. 11, No. 2, pages 98–102; February 1953). In addition to the dialyzable fraction, a varying portion of the growth factor is present in a non-dialyzable form. The latter may be precipitated by ethanol at a concentration between 60–80%.

The infrared adsorption spectrum of a mineral oil mull of the *Lactobacillus bifidus* growth-promoting factor exhibits characteristic maxima at approximately the following wave lengths: 3700, 3000, 2360, 1820, 1600, 1500, 1410, 1190, 920, 830, 800 and 740 cm.$^{-1}$. Of these, the maxima at 1820, 1410, 920, 830, 800 and 740 cm.$^{-1}$ are broad maxima. The maxima at 3700, 3000, 1600 and 1500 cm.$^{-1}$ are relatively sharper peaks.

As recovered from breast milk, the *Lactobacillus bifidus* growth-promoting factor is found to have an activity for promoting the growth of strains of the *Lactobacillus bifidus* microorganism, typically the *Lactobacillus bifidus* var. *pennsylvanicus* strain, which is more than thirty times that of the human milk fraction initially subjected to adsorption in the process by which the factor is recovered from human milk. Hereinafter, whenever the *Lactobacillus bifidus* growth-promoting factor is referred to, this material is the biologically-active substance intended.

In view of the importance of the *Lactobacillus bifidus* var. *pennsylvanicus* strain as recovered from the feces of breast-fed infants and characterized serologically in nutrition, and especially in infant nutrition, considerable research work has been carried out with this special strain. The fact that it needs human milk (or the growth factor present in human milk) for its propagation and growth, and shows no growth in usual mediums satisfactory for most strains of *L. bifidus*, was recognized by one of us, and this characteristic of the var. *pennsylvanicus* strain has been discussed in a paper published in Pediatrics, vol. 11, No. 2 (February 1953), pages 98 to 108, the paper being entitled "A hitherto unrecognized biochemical difference between human milk and cow's milk." This strain of the microorganism is also referred to (under the designation No. 212A) in an article by Williams, Norris and György, which is published under the title: "Antigenic and cultural relationships of *Lactobacillus bifidus* and *Lactobacillus parabifidus*" in the March-April 1953 issue of the Journal of Infectious Diseases, vol. 92, pp. 121–131. It is pointed out in that article that this specific strain will not grow in the chemically defined medium of Norris et al. (Jour. of Bacteriology; 60, pp. 681–696), unless breast milk is added as a supplement to this medium. The growth requirements of this variant of the *Lactobacillus bifidus* microorganism, with special reference to the fact that var. *pennsylvanicus* will grow in the regular medium for *Lactobacillus bifidus* only after human milk has been added thereto, are further discussed in the publication of György, Norris and Rose in Archives of Biochemistry and Biophysics, volume 48, page 193 et seq. (January 1954).

This variant of the *L. bifidus* microorganism, which showed scant or undetectable growth in the usual medium, i. e., that of Norris et al., and which requires human milk, or the active *L. bifidus* growth-promoting factor contained therein, for its growth, does not differ morphologically from regular strains of the microorganism. Thus, *Lactobacillus bifidus* var. *pennsylvanicus* is microaerophilic and gram-positive, showing typical branching. Serologically, however, it appears to contain a distinct antigenic component, different from that found in other strains of *L. bifidus*. Moreover, the new strain is characterized by distinct lability, sometimes showing a tendency towards the formation of very mucoid colonies on plates and greatly increased viscosity in liquid mediums. Such mucoid colonies retain, in repeated transfer, their mucoid character, and no reversion to the original non-mucoid strain has been observed. These mucoid colonies, however, still require the presence of human milk (or the growth-promoting factor contained therein) for their growth.

Regular strains of *Lactobacillus bifidus* may utilize maltose interchangeable with lactose. In contrast thereto, *L. bifidus* var. *pennsylvanicus*, in addition to the growth factor, requires lactose as its source of carbohydrate. It will show only very scant growth in the present of maltose. Except as to its requirement for lactose and for the special growth factor present in human milk in order that appreciable growth may occur, differences in the metabolic pattern of *L. bifidus* var. *pennsylvanicus* from that of regular bifid strains of the *Lactobacillus bifidus* microorganism have not been observed.

Since the discovery that the *Lactobacillus bifidus* var. *pennsylvanicus* strain, one of the important constituent strains present in the intestinal flora of a nursling, would grow only in the presence of a special nutritional factor which is present in human milk (which factor has been termed the *Lactobacillus bifidus* growth-promoting factor), attempts have been made to find other materials which would supply this growth-promoting factor in addition to human milk. Among substances that have been found active, there may be mentioned β-methyl-N-acetyl-d-glucosaminide and variously treated naturally-occurring products such as hydrolyzed chitin as derived from crab and lobster shell. Various other materials, including hog gastric mucin, N-acetyl-d-glucosamine itself, and blood group substances A and O, have also been found active.

In our copending application we have disclosed a process for the preparation of a mixed material which is active in promoting growth of the *Lactobacillus bifidus* var. *pennsylvanicus* microorganism, A. T. T. C. No. 11,863. This process results in a mixed product containing two chemical compounds, one of which is active in promoting growth of said microorganism, while the other is inactive. These two chemical compounds can be characterized as 4-O-β-D-galactopyranosyl-N-acetyl-D-glucosamine (active) and 6-O-β-D-galactopyranosyl-N-acetyl-D-glucosamine (inactive).

In the process for producing these two compounds in admixture disclosed in our copending patent application, lactose and N-acetyl-D-glucosamine are reacted in the presence of an enzyme which is present in growing cultures of *Lactobacillus bifidus* var. *pennsylvanicus*, which enzyme is secured for use in said synthesis by a procedure described in the application. This procedure, in brief, involves centrifuging a growing culture of said microorganism, lyophilizing the solid to secure a dry product, and intimately mixing the dry product with aluminum oxide in the presence of a phosphate buffer solution, thereby securing a solution of said enzyme which is useful in the process.

We have now found that if the enzymatic synthesis is carried out using living intact cells of said *Lactobacillus bifidus* var. *pennsylvanicus* microorganism instead of an enzyme derived therefrom, not only is the yield of the desired microbiologically-active compound, 4-O-β-D-galactopyranosyl-N-acetyl-D-glucosamine, greater than that secured by the process of our copending application, but the product is almost all the desired active compound, practically none of the inactive isomer being present in the reaction mixture. This is a very important advantage since approximately one-half of the product secured when the enzyme is used in the reaction is not active for promoting the growth of *Lactobacillus bifidus* var. *pennsylvanicus*. By our improved method, utilizing living intact cells of the microorganism itself, only negligible amounts of the inactive isomeric 6-O-β-D-galactoside are formed. These isomeric compounds may be represented by the following structural formulae:

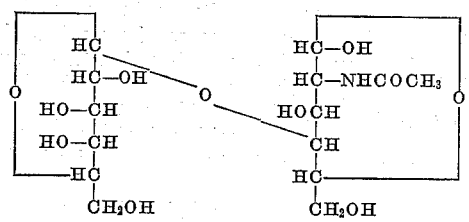

4-O-β-D-galactopyranosyl-N-acetyl-D-glucosamine (active)

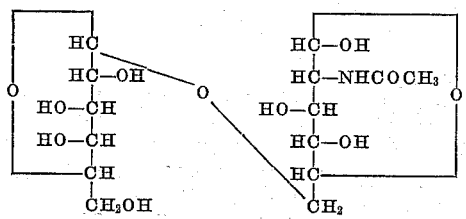

6-O-β-D-galactopyranosyl-N-acetyl-D-glucosamine (inactive)

Our improved process wherein the reaction between lactose and N-acetyl-D-glucosamine is carried out by incubating intact cells of the microorganism with the reactants also has the further advantage that there is no loss of active disaccharide on prolonged incubation. A process which permits production of the active 4-O-β-D-galactopyranosyl-N-acetyl-D-glucosamine for periods up to 48 hours without appreciable loss of formed active product has definite commercial advantages, since it avoids the necessity, characteristic of many enzymatic methods, of stopping the reaction and recovering the product at a definite point in the synthesis.

In carrying out our improved process the lactose and N-acetyl-D-glucosamine are brought together in the presence of intact cells of *Lactobacillus bifidus* var. *pennsylvanicus*, A. T. C. C. No. 11,863, and incubation is continued for any desired period up to forty-eight hours or even longer. The greatest yield of the microbiologically-active 4-O-β-D-galactopyranosyl-N-acetyl-D-glucosamine is obtained under anaerobic conditions, but aerobic conditions can also be employed with, however, a slight increase in the amount of unwanted inactive isomer. The pH should fall within the range 4.0 to 7.0, and the temperature within the range 15° to 40° C. We have secured very satisfactory results when the reaction is carried out at a temperature of approximately 37° C. and at a pH of approximately 5.4, the pH being maintained within the specified range by the use of a phosphate buffer.

The living microorganism may be propagated and maintained in accordance with the procedure described in our copending application utilizing the culture mediums therein described. See also the paper of György et al., Arch. Biochem. and Biophys., 48, 193 (1954). The living cells may be collected by centrifugation or other suitable procedure, washed and supplied to the mixture of lactose and N-acetyl-D-glucosamine as a concentrated suspension. The reaction requires a molar ratio of lactose to N-acetyl-D-glucosamine of 2:1, and the reactants should be present in approximately this proportion. The process is advantageously carried out by suspending the intact cells of *L. bifidus* var. *pennsylvanicus* in an aqueous phosphate buffer solution, and then adding lactose and N-acetyl-D-glucosamine thereto in the molar ratio of two moles of lactose to one of the N-acetyl-D-glucosamine. The mixture is then incubated at a temperature within the range 15° to 40° C., preferably at about 37° C. Anaerobic incubation is preferred since it results in the highest yield of the desired 4-O-β-D-galactopyranosyl-N-acetyl-D-glucosamine and minimal amounts of the inactive isomer. However, the incubation can also be carried out under aerobic conditions, but with a lowered yield of the desired active compound and increased amounts (although still relatively small) of the inactive isomer. The conversion of part of the lactose into undesired products such as glucose and galactose is more pronounced under aerobic conditions than when the synthesis is carried out anaerobically, but fairly good yields of 4-O-β-D-galactopyranosyl-N-acetyl-D-glucosamine can also be obtained by incubation under aerobic conditions. By anaerobic conditions we mean those in which the amount of oxygen in the ambient atmosphere in contact with the reaction mixture does not exceed 4%.

In recovering the active product, 4-O-β-D-galactopyranosyl-N-acetyl-D-glucosamine, from the reaction mixture we have found it advantageous first to heat the digest, after termination of incubation, to about 100° C. for about one hour, and then centrifuge off the supernatant. The supernatant is then concentrated to a reduced volume and adsorbed on a chromatographic column containing a suitable adsorbent. This may, for example, consist of two parts of carbon and one part of diatomaceous earth. Of course other adsorbents may also be utilized, and they need not necessarily be employed in columnar form. The adsorbed material is then eluted from the column with suitable eluting agents such as water and aqueous ethanol. Evaporation of the aqueous ethanolic eluates to dryness yields a solid product comprising the active compound. It may be recovered in purified crystalline form by recrystallizing it from suitable solvents, such as dry methanol, in the usual manner.

The following examples are illustrative of our preferred process.

*Example 1*

*Lactobacillus bifidus* var. *pennsylvanicus*, A. T. C. C. No. 11,863, was grown in accordance with the procedure described in the publication of György, Norris and Rose, Arch. Biochem. and Biophys., vol. 48 (1954), page 193. This medium contained, as the basic medium, those substances given as essential in our copending application, Serial No. 397,469, and also included a material supplying the essential growth factor for *L. bifidus* which may be a small amount of skimmed human milk. Cells from 40-hour cultures were collected by centrifugation and then washed twice with 0.85% saline and once with M/15 phosphate buffer of pH 5.4. A suitable phosphate buffer may comprise a 0.1 molar solution of a mixture of disodium and potassium phosphates, such, for example, as sodium orthophosphate $Na_2HPO_4$ and dipotassium orthophosphate $K_2HPO_4$.

The cells were then suspended in the same phosphate buffer solution of M/15 molar concentration so that 3 milliliters of the cell suspension represented cells from 100 milliliters of the culture. Three milliliter aliquots of this cell suspension were then added to 10 milliliter portions of M/15 phosphate buffer containing 382 milligrams of N-acetyl-D-glucosamine and 625 milligrams of lactose (monohydrate). These cell-substrate suspensions were then incubated at 37° C. in suitable cotton-plugged vessels. Anaerobic incubation was carried out by first evacuating the vessels and then filling them three times with nitrogen gas, followed by evacuation before finally restoring atmospheric pressure by the addition of a mixture comprising 10 per cent of carbon dioxide and 90 percent of nitrogen. In carrying out the reaction under aerobic incubation, the flasks were allowed to stand in the atmosphere without agitation. In each case incubation was continued for periods up to 48 hours. Samples were taken at intervals and analyzed for reducing sugars and N-acetylamino sugars by paper chromatography using in the test the supernatant secured by heating each sample for 10 minutes at 100° C., cooling, and centrifuging.

The greatest yields of 4-O-$\beta$-D-galactopyranosyl-N-acetyl-D-glucosamine were obtained under conditions of anaerobic incubation. Under aerobic conditions the yield was somewhat reduced and the amount of galactopyranosyl-N-acetyl-D-glucosamine somewhat larger. However, in all cases, the amount of inactive material was very small being negligible under anaerobic incubation conditions.

Formation of the active disaccharide during incubation was indicated by the regular increase in growth-promoting activity for Lactobacillus bifidus var. pennsylvanicus as expressed in growth units per milliliter of the supernatant fluid assayed. From an initial activity of 6 units per milliliter (due solely to the N-acetyl-D-glucosamine present), within 24 hours under conditions of anaerobic incubation the activity increased to 30 units per milliliter and remained at this figure throughout the entire 48 hour incubation period. Under aerobic conditions the activity at the end of 24 hours incubation had increased to 20 units per milliliter. After 48 hours of aerobic incubation the activity had dropped only slightly below the 20 units per milliliter value.

The concentration of the intact cells of L. bifidus var. pennsylvanicus in the reaction mixture did not affect production of the active compound unduly, as the same amount of growth-promoting activity was secured when the cell concentration was only 30 percent of that initially tested. Synthesis occurred even when the cell concentration was only about 1 percent of that initially used.

*Example 2*

Lactobacillus bifidus var. pennsylvanicus cells were secured from 8 liters of culture medium and prepared as described above. These cells were then incubated for 24 hours in a liquid medium containing 16.5 grams of lactose (monohydrate) and 10.1 grams of N-acetyl-D-glucosamine in 345 milliliters of M/15 phosphate buffer at pH 5.4. The phosphate buffer was a mixture of disodium orthophosphate and dipotassium orthophosphate of approximately 0.1 molar concentration.

The digest was heated for one hour in an oven at 100° C. and then centrifuged. The supernatant was concentrated at a reduced pressure less than atmospheric to a volume of approximately 50 milliliters. This concentrate was adsorbed on a column comprising 320 grams of decolorizing carbon and 160 grams of diatomaceous earth. For the decolorizing carbon it was found convenient to use Norite A (Pfanstiehl) and the diatomaceous earth was Celite 535 (Johns-Manville Corporation).

The column was then eluted with water and aqueous ethanol, the general procedure followed being that described in the paper by Zilliken, Smith, Rose and György in Journal Biol. Chem., 208, page 299 (1954).

The eluates of 7.5% ethanol concentration were evaporated to dryness at a reduced pressure less than atmospheric. The amorphous residue was dried under potassium pentoxide in a desiccator and then dissolved in 80 milliliters of hot dry methanol. The hot methanolic solution was then filtered and allowed to stand at room temperature. Crystallization of square platelets began immediately and was completed after a few hours standing at 5° C. After recrystallization of the product from a minimum amount of dry methanol there was obtained 1.02 grams of the disaccharide, the yield being approximately 5.4%. A sample of the product had a melting point of 172° C. (uncorrected); a specific rotation of $[\alpha]_D^{25} +27.8°$ (H$_2$O; C=1, equilibrium rotation reached after 180 minutes). Extrapolated to zero time, the rotation was $[\alpha]_D +51.2°$. The disaccharide crystallized with one mole of methanol and analysis confirmed the empiric formula $C_{14}H_{25}O_{11}N \cdot CH_3OH$. Comparison of the product by the mixed melting point method, and by microbiological assay, with pure 4-O-$\beta$-D-galactopyranosyl-N-acetyl-D-glucosamine as obtained from hog stomach mucin showed that the product was identical with the known compound as secured from animal tissue.

The product was added as such and without further purification to foodstuffs which were both deficient in, and totally lacking in, the L. bifidus growth-promoting factor. In this way the resulting food products were analogous to human milk in that they contained this important nutritional factor.

Various modifications and variations in our process, a preferred embodiment of which has been herein set forth, will be apparent to those skilled in the art. To the extent that these are within the scope of the appended claims, they are to be considered as part of our invention.

We claim:

1. The process of preparing 4-O-$\beta$-D-galactopyranosyl-N-acetyl-D-glucosamine, said compound being active in promoting growth of Lactobacillus bifidus var. pennsylvanicus A. T. C. C. No. 11,863, which comprises reacting lactose and N-acetyl-D-glucosamine in the presence of living intact cells of said Lactobacillus bifidus var. pennsylvanicus microorganism.

2. The process of preparing 4-O-$\beta$-D-galactopyranosyl-N-acetyl-D-glucosamine, said compound being active in promoting growth of Lactobacillus bifidus var. pennsylvanicus A. T. C. C. No. 11,863, which comprises reacting lactose and N-acetyl-D-glucosamine in the presence of living intact cells of said Lactobacillus bifidus var. pennsylvanicus microorganism, said reaction being carried out at a pH within the range 4.0 to 7.0 and at a temperature with the range 15° to 40° C.

3. The process of preparing 4-O-$\beta$-D-galactopyranosyl-N-acetyl-D-glucosamine, said compound being active in promoting growth of Lactobacillus bifidus var. pennsylvanicus A. T. C. C. No. 11,863, which comprises reacting lactose and N-acetyl-D-glucosamine in the presence of living intact cells of said Lactobacillus bifidus var. pennsylvanicus microorganism, said reaction being carried out at a temperature of approximately 37° C. and a pH of 5.4.

4. The process defined in claim 3 wherein said pH is maintained by the presence in said reaction mixture, together with said reactants, of a phosphate buffer capable of maintaining said specified pH.

5. The process of preparing 4-O-$\beta$-D-galactopyranosyl-N-acetyl-D-glucosamine, said compound being active in promoting growth of Lactobacillus bifidus var. pennsylvanicus A. T. C. C. No. 11,863, which comprises reacting lactose and N-acetyl-D-glucosamine in the presence of living intact cells of said Lactobacillus bifidus var. pennsylvanicus microorganism, and recovering said compound from the reaction mixture.

6. The process of preparing 4-O-$\beta$-D-galactopyranosyl-N-acetyl-D-glucosamine, said compound being active in promoting growth of Lactobacillus bifidus var. pennsylvanicus A. T. C. C. No. 11,863, which comprises reacting lactose and N-acetyl-D-glucosamine in the presence of living intact cells of said *Lactobacillus bifidus* var. *pennsylvanicus* microorganism, said reaction being carried out at a temperature of approximately 37° C. and a pH of 5.4, and isolating said compound by adsorbing said reaction mixture on a chromatographic column, eluting therefrom a solution containing said microbiologically-active compound, and crystallizing said compound from anhydrous methanol.

No references cited.